United States Patent [19]

Greger

[11] Patent Number: 5,388,732

[45] Date of Patent: Feb. 14, 1995

[54] VESSEL WITH POURING SPOUT INDUCING CONSTANT GEOMETRY, NON-TURBULENT STREAM AND VENTED CLOSURE FOR SAME

[75] Inventor: Richard W. Greger, Corning, N.Y.

[73] Assignee: Corning Incorporated, Corning, N.Y.

[21] Appl. No.: 913,199

[22] Filed: Jul. 15, 1992

Related U.S. Application Data

[63] Continuation-in-part of Ser. No. 885,866, May 20, 1992, abandoned.

[51] Int. Cl.$^6$ .................................................. A47J 27/00
[52] U.S. Cl. .................................. 222/572; 222/575; D7/361; 210/467
[58] Field of Search ............... 222/566, 571, 572, 575; D7/361, 354, 360; 220/912, 574; 210/464–467

[56] References Cited

U.S. PATENT DOCUMENTS

| D. 230,459 | 2/1974 | Gulotta | D7/360 |
|---|---|---|---|
| D. 237,133 | 10/1975 | Cyren | D7/318 |
| 254,500 | 3/1882 | Oberman | 210/467 |
| 630,414 | 8/1899 | Schwartz | 210/457 |
| 1,733,450 | 10/1929 | Detwiler | D7/359 X |
| 1,802,005 | 4/1931 | Detwiler | 219/454 X |
| 2,006,704 | 7/1935 | Van Muffling | D7/361 X |
| 2,083,017 | 6/1937 | Hayes | 210/466 |
| 2,185,897 | 1/1940 | Krause | 210/244 |
| 2,303,841 | 12/1942 | Kircher | 222/553 |
| 4,310,418 | 1/1982 | Busbey | 210/467 |
| 4,626,352 | 12/1986 | Massey | 210/469 |

FOREIGN PATENT DOCUMENTS

| 927841 | 11/1947 | France | 222/571 |
|---|---|---|---|
| 471 | of 1891 | United Kingdom | 222/571 |
| 700357 | 12/1953 | United Kingdom | 222/572 |

OTHER PUBLICATIONS

1979 Corning Sales Literature showing Double Lipped Pan.

Primary Examiner—Andres Kashnikow
Assistant Examiner—Anthoula Pomrening
Attorney, Agent, or Firm—Timothy M. Schaeberle; Alfred L. Michaelsen

[57] ABSTRACT

A vessel having a bottom with a vertical center-line and an annular side wall extending upward from the bottom of the vessel terminating into a rim portion. The vessel is further provided with at least one pouring spout formed in the side wall and extends peripherally about the side wall for at least a 75 degree arc with respect to the vertical centerline of the bottom. The pouring spout consists of two opposing concave upper pouring spout surfaces which converge upon and join a concave lower throat surface. The pouring spout thus provides a cross-sectional flow pattern initially in the shape of a convex-sided V that reforms into a round non-turbulent stream regardless of the flow rate of the liquid being poured. A complementary closure having at least one array of openings, for venting steam and/or straining liquids being prepared in the vessel is also disclosed.

5 Claims, 9 Drawing Sheets

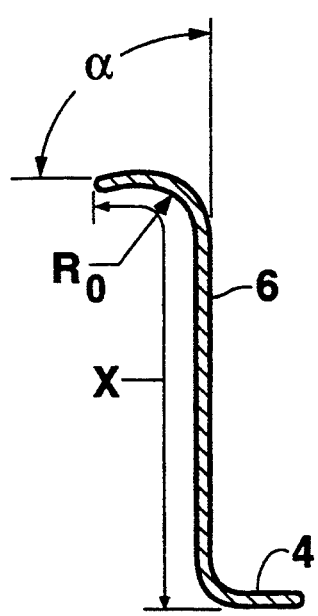
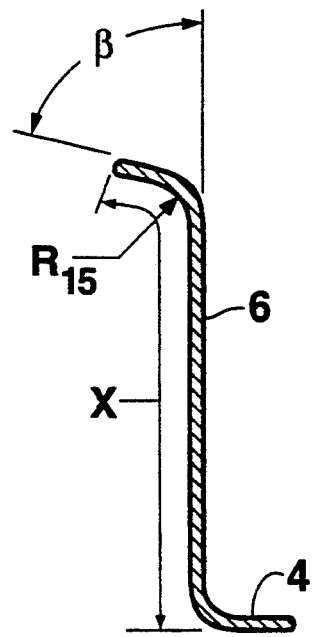
FIG. 5a    FIG. 5b
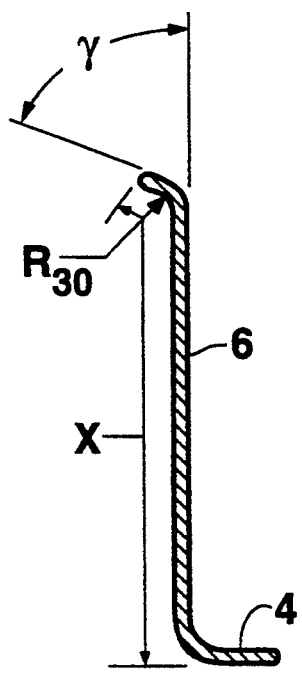
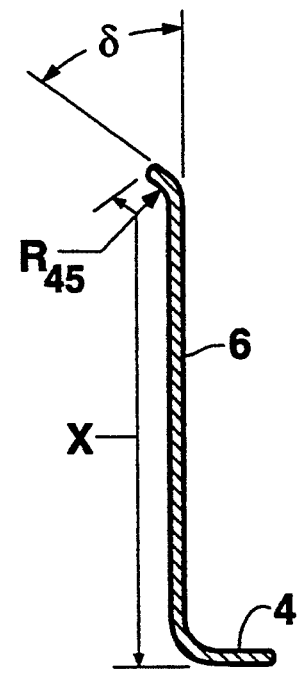
FIG. 5c    FIG 5d

VESSEL WITH POURING SPOUT INDUCING CONSTANT GEOMETRY, NON-TURBULENT STREAM AND VENTED CLOSURE FOR SAME

This is a continuation-in-part of U.S. patent application having Ser. No. 07/885,866, filed on May 20, 1992, now abandoned.

BACKGROUND OF THE INVENTION

This invention relates generally to vessels having pouring spouts, and is particularly suitable for cookware having pouring spouts adapted to allow the transferring of liquids, sauces, and other foods contained within the cookware.

Because the disclosed invention is particularly suitable for cookware, the invention will be disclosed in relation to that exemplary application. However, it should be noted that the invention is not specifically limited to that application, as it is applicable to vessels other than those intended for kitchen or domestic use.

Cooking vessels used for heating and cooking liquids of varying viscosities containing a wide range of relatively solid food particles suspended therein are in daily use throughout the world. Upon completion of heating the contents of the vessel, it is frequently desirable to precisely control the rate and direction of flow of the contents into another vessel for additional preparation, cooling, storing, serving, or disposal. Additionally, when cooking meat products wherein fat is rendered, or liquified fat or oil is used as a cooking medium, it is common to pour the excess fat or oil into another vessel for future use or disposal.

The prior art is replete with vessels having pour spouts to aid in the transferring of the contents of a first vessel into a second receiving vessel. However, prior art vessels share a common shortcoming in that when the contents are poured out of the first vessel, the resulting stream is not geometrically constant and tends to exit the vessel at varying rates. For example, the contents of the vessel would lap the outside of the vessel if the pouring rate was too slow, and conversely, if the pouring rate was too fast, the contents would exit the vessel in a non-uniform, waterfall-like geometry resulting in poor directional and flow rate control. Such stream characteristics resulted in undesired dripping, spillage, and possibly overfilling the receiving vessel. The spillage and dripping occurring from the lack of control when pouring contents out of a vessel not only forms an inconvenience to the user, but in some extreme cases may provide a hazard to an inattentive user when transferring hot oil or fats.

Thus, there is a need for vessels having a pouring spout that provides a uniform geometric flow pattern regardless of the particular pouring rate of the contents exiting the vessel.

There also remains a need for vessels having a pouring spout that essentially eliminates unwanted lapping of liquids onto the exterior of the vessel while pouring the contents of the vessel.

There is a further need for vessels having a pour spout that essentially eliminates unwanted dripping of liquids from the spout after pouring from the vessel.

SUMMARY OF THE INVENTION

Hence, it is an objective of the present invention to provide a vessel possessing a pouring spout which provides for easy control of the direction and the rate of flow of the liquid being poured from the vessel. Furthermore, the pouring spout configuration is such that the liquid being poured retains an initially convex-sided V-shaped flow pattern that reforms into a generally round, non-turbulent stream, regardless of the flow rate of the liquid, or substance, being poured.

A further objective of the present invention is to provide a vessel possessing a pouring spout which prevents unwanted lapping of the liquid onto the exterior of the vessel while pouring from the vessel and which prevents liquid from dripping from the spout after pouring has been completed.

A yet further objective is to provide a complementary closure, or lid, to the disclosed vessel in which steam is allowed to escape, as well as allowing for the straining of the contents of the vessel.

In accordance with the above objects, a vessel achieving the above objectives, as well as others, is disclosed. The vessel has a bottom having a vertical center-line and an annular side wall extending upward from the bottom and terminating into a rim portion. The vessel is provided with at least one pouring spout formed in the side wall and extending peripherally about the side wall for at least a 75° arc with respect to the vertical center-line of the bottom. The spout is peripherally centered about a bisect-line located approximately in the middle of the arc. The pouring spout is defined by the rim portion making a transition into two opposing concave upper pouring spout surfaces which converge upon and join a concave lower throat surface located between the two concave upper pouring spout surfaces. The concave lower throat surface is positioned a predetermined distance below the rim portion of the side wall. The pouring spout is further provided with a lip extending outwardly away from the side wall. The lip has a predetermined curve profile having vertical and horizontal components and the lip is of a predetermined length that varies as a function of the peripheral distance from the bisect-line of the arc occupied by the spout. The length of the lip is at a maximum at the bisect-line of the arc, and is at a minimum where the concave upper pouring spout surfaces respectively make a transition into the rim portion. The spout provides a cross-sectional flow pattern initially in the shape of a convex-sided V that reforms into a round non-turbulent stream regardless of the flow rate of the liquid being poured.

A complementary cover to the disclosed vessel is also disclosed. The cover includes a top surface and a peripheral flange extending from the top surface a predetermined distance. The flange is configured and dimensioned to be slidably received, and rotationally positionable, within the interior of the vessel. The flange is further provided with at least one section having a plurality of openings.

BRIEF DESCRIPTION OF THE DRAWINGS

FIGS. 5a–5d are cross-sectional views of the side wall as taken along section lines 5a, 5b, 5c, and 5d as shown in FIG. 4.

DETAILED DESCRIPTION OF THE DRAWINGS

Figure 1:
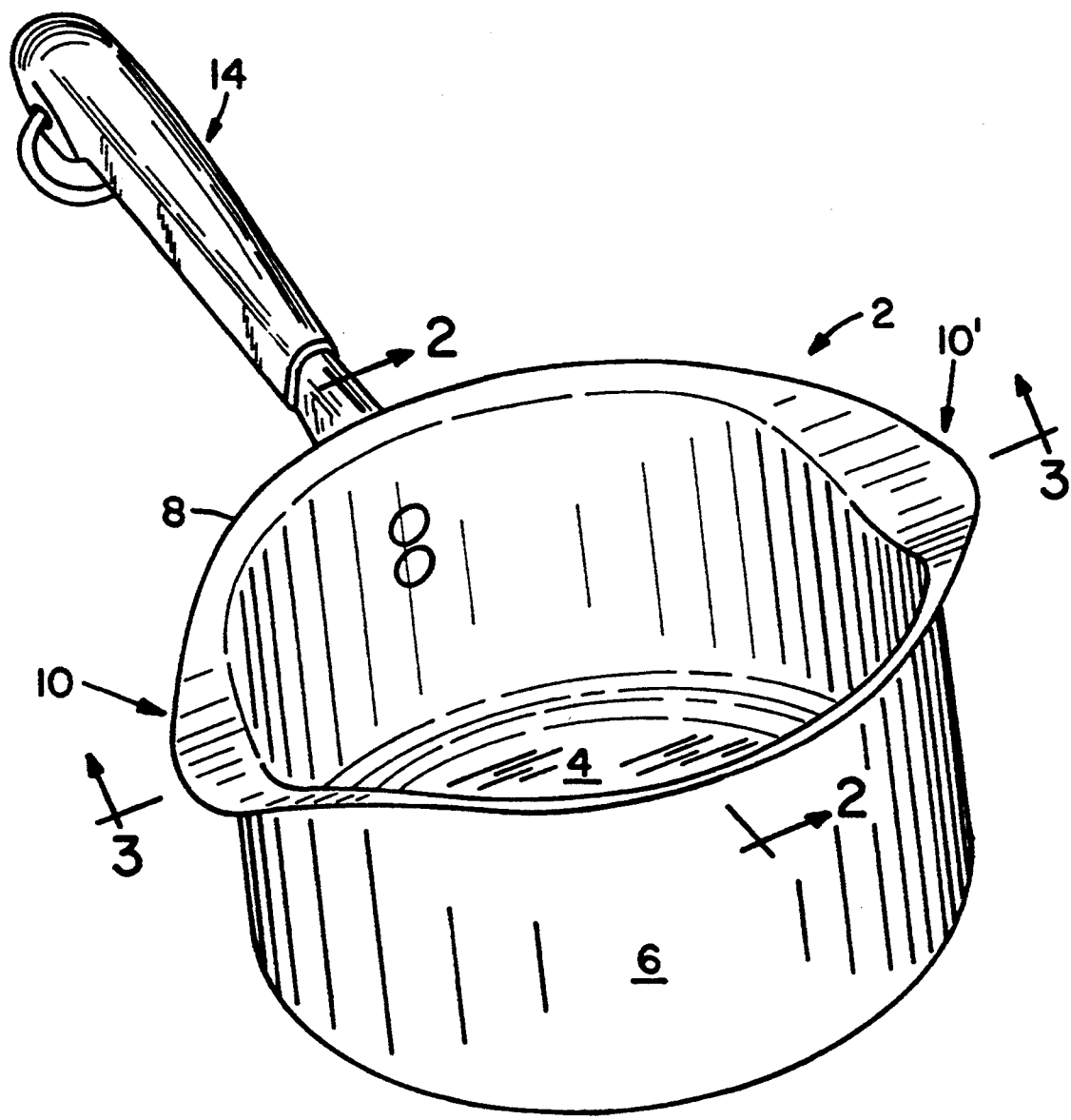
FIG. 1 is an upper perspective view of cookware incorporating a pair of opposing pouring spouts according to the preferred embodiment of the invention.
Figure 2:
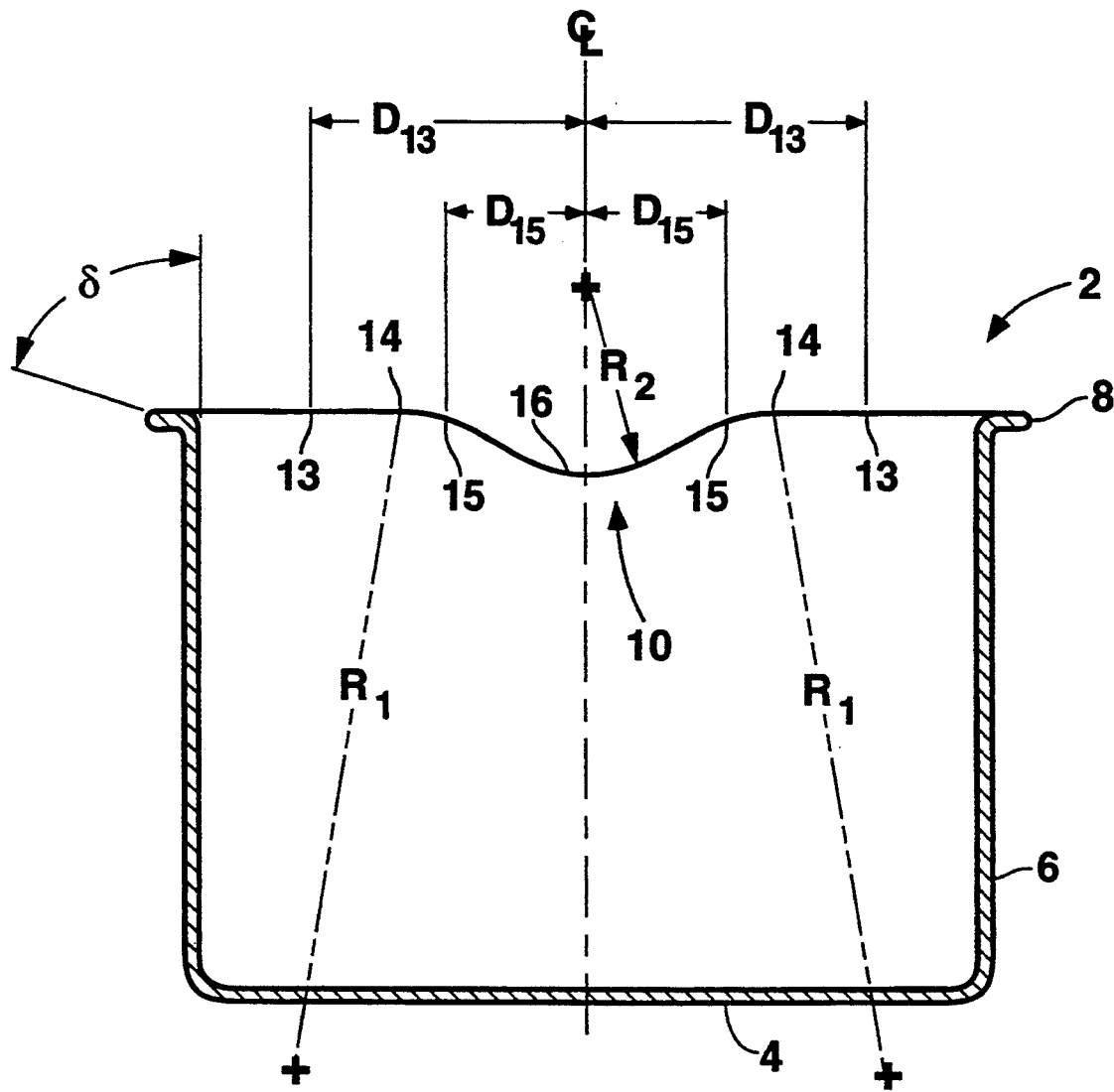
FIG. 2 is a sectional view of the cookware taken along section line 2—2 as shown in FIG. 1.
Figure 3:
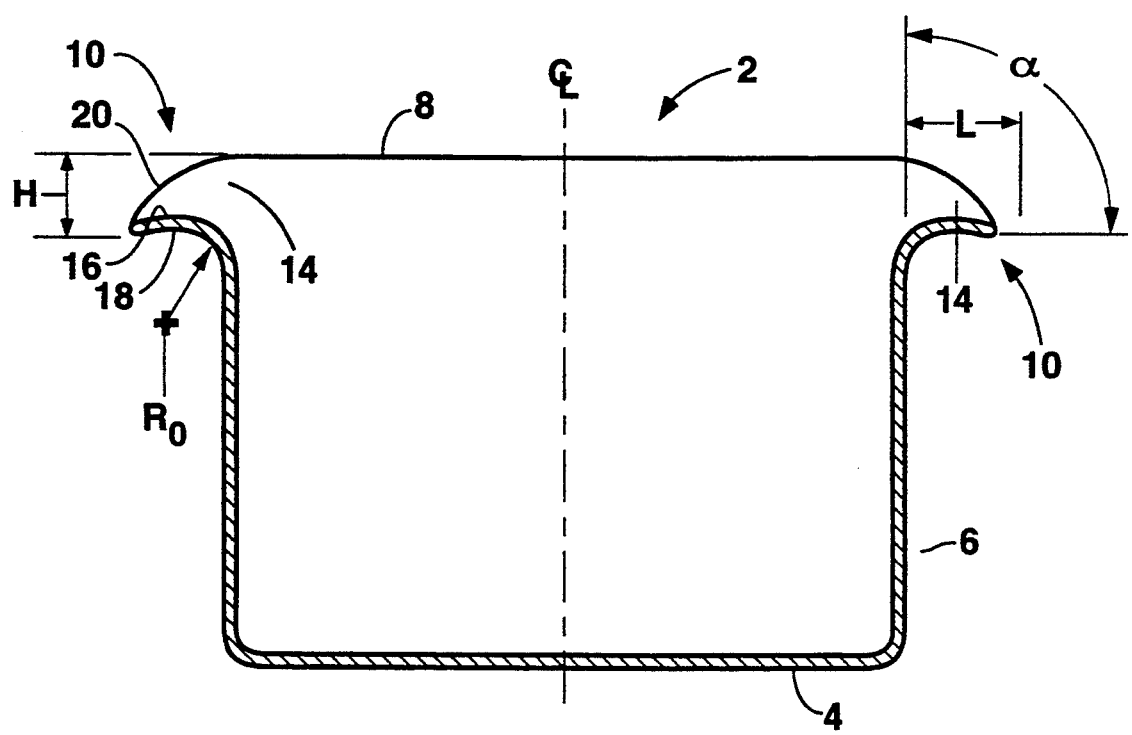
FIG. 3 is a sectional view of the cookware taken along section line 3—3 as shown in FIG. 1.

Referring now to FIG. 1, which shows a perspective view of a cooking vessel 2 commonly referred to as a sauce pan. Cooking vessel 2 has a bottom 4 with an annular side wall 6 extending upward therefrom and terminating into rim portion 8. Vessel 2 is further provided with at least one pouring spout 10, and vessel 2 shown in the drawings, includes an optional second pouring spout 10' located approximately 180° from spout 10. A handle 14 is attached to vessel 2 and located approximately 90° from each pouring spout. Vessel 2 having two pouring spouts, in lieu of one, is beneficial to users who prefer to have a choice of grasping handle 14 with the less dominant hand thereby resulting in the dominant hand being free to manipulate a utensil, such as a spoon or ladle, etc., while pouring from a selected spout. Alternatively, the user may grasp handle 14 with the dominate hand and pour from the opposite spout. Providing two pouring spouts, in lieu of one, is also of benefit to users who lack the use of a particular hand or arm as the vessel can be poured from the spout most suitable to that particular user. However, one such spout is sufficient to practice the disclosed invention. FIG. 1 includes sectional lines 2—2 and 3—3 of which sectional views taken along those lines are shown in FIGS. 2 and 3 respectively. Handle 14 is shown only in FIG. 1 and has been omitted from the remainder of the drawings.

Figure 4:
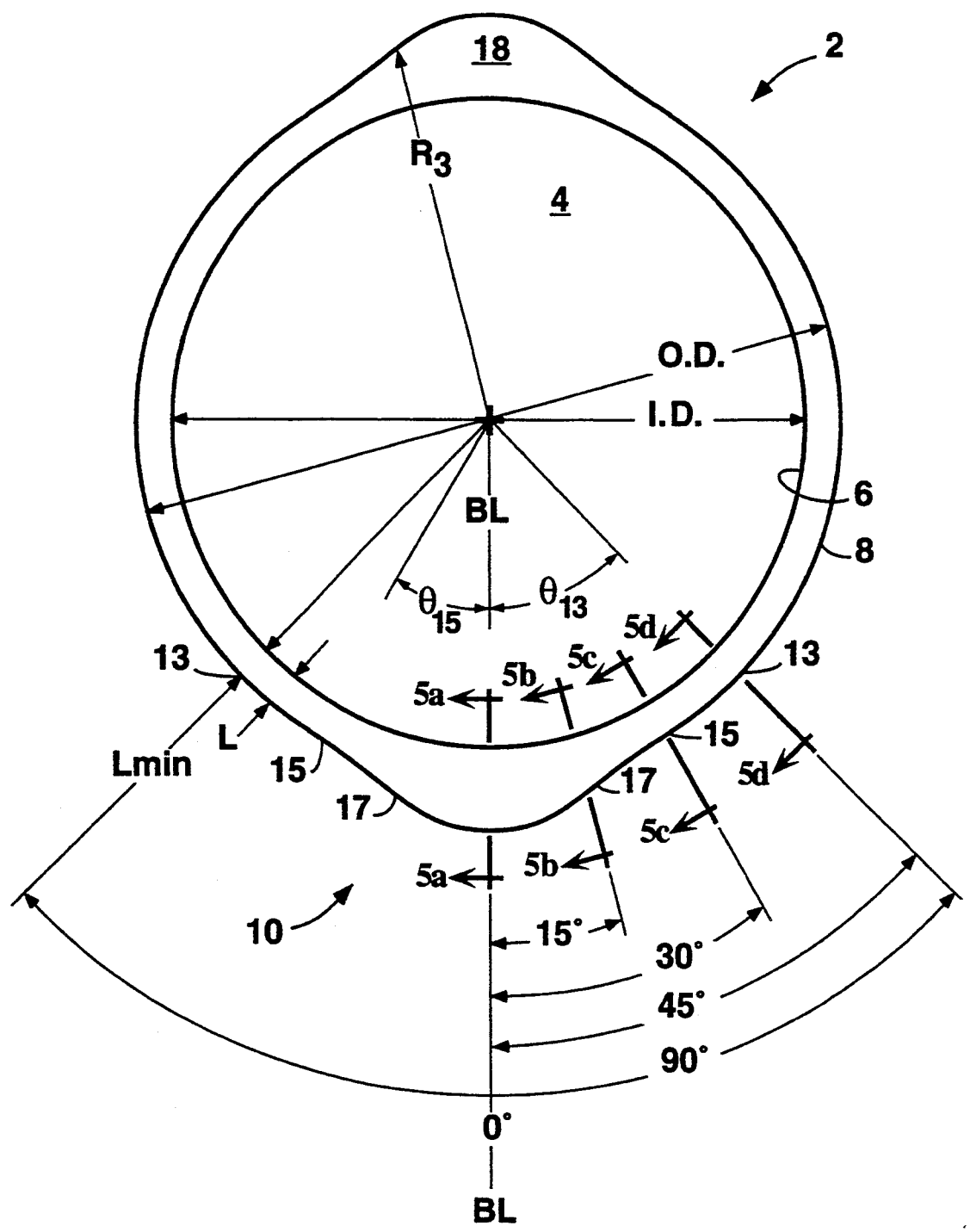
FIG. 4 is a top view of the cookware shown in FIG. 1.

Referring now to FIG. 2, a vertical center-line CL, extending from bottom 4, serves as a reference for determining the peripheral extent of pouring spout 10 along side wall 6. Turning now to FIG. 4, which is a top view of vessel 2, the pouring spout extends along side wall 6 for at least a 75° arc with respect to the vertical center line which is shown centrally located in vessel 2 in FIG. 4. Preferably the total arc is approximately 90°. Bisect-line BL, which is located in the approximate center of the arc occupied by the spout, depicts the peripheral center location of pouring spout 10 within the arc occupied by the pouring spout.

Referring back to FIG. 2, rim portion 8 makes a gradual transition into two opposing convex upper pouring spout surfaces 14. Preselected transition point 13, in which rim 8 makes the transition into convex upper pouring spout surfaces 14 defines the outer limits of spout 10. Opposing convex upper pouring spout surfaces 14 converge upon, and intersect with, a concave lower throat surface 16 at a preselected common tangential transition point 15. The lower most section of concave lower throat surface 16 is positioned a predetermined distance H (shown in FIG. 3) from below rim surface 8 of side wall 6. The radius of curvature of convex upper pouring spout surface 14, in the plane of FIG. 2, is depicted as R1 and thus renders the curve of surface 14 to be convex as viewed in FIG. 2. Preferably, R1 is a function of the equation:

$$R1 = 1.44D - 4.96$$

wherein R1 is the radius of curvature for surface 14, and D is the nominal inside diameter of vessels having a nominal inside diameter greater than approximately 4.5 inches.

The radius of curvature of concave lower throat surface 16 in the plane of FIG. 2, is depicted as R2 and thus renders the curve of surface 16 to be concave as viewed in FIG. 2. Preferably, R2 is a function of the equation:

$$R2 = 0.52D - 2.11$$

wherein R2 is the radius of curvature of surface 16, and D is the nominal inside diameter of vessels having a nominal inside diameter greater than approximately 4.5 inches.

Dimension H, shown in FIG. 3, locates the lower most portion of concave lower throat surface 16 below the top of rim portion 8. Dimension H, indirectly determines the location of rim to convex upper spout surface transition point 13 and convex upper spout surface—convex lower throat surface common tangential transition point 15. That is, once H is selected, the curvatures defined by R1 and R2 determine where points 13 and 15 will be located. Preferably, H is a function of the equation:

$$H = 0.005D + 0.516$$

wherein H is the vertical distance between the top of rim portion 8 and the lower most portion of concave lower throat surface 16, and D is the nominal inside diameter of vessels having a nominal inside diameter greater than approximately 4.5 inches. Coincidentally, the location of transition points 13 and 15 are also determinable with respect to the arc occupied by pouring spout 10 as shown in FIG. 4. Point 13, as previously defined, is located at the outer limits of pouring spout 10 on an arc having center-line CL as the center of the arc's radius. Generally, point 15 is located along that same arc at an angle approximately equal to ¼ the total angle of the arc. To illustrate, a pouring spout occupying a 90° arc, will have a transition point 13 at an angle of 45° ($\theta_{13}$) from bisect-line BL, and will have a transition point 15 at an angle of 22.5° ($\theta_{15}$) from bisect-line BL as shown in FIG. 4.

Referring now to FIG. 2, preferably rim 8 diverges away from an essentially vertically oriented side wall 6 by the angle δ. However, rim region 8 need not be divergent, nor does side wall 6 need to be vertical to practice the disclosed invention.

Referring now to FIG. 3 which is a cross-sectional view of vessel 2 taken along line 3—3 of FIG. 1. Pouring spout 10 includes a lip 18 which extends outwardly away from side wall 6 a length L, measured from the inside of side wall 6 to the edge of the lip. Lip 18 also has a curvature 20 that includes both horizontal and vertical components as viewed in the plane shown in FIG. 3. The vertical components of lip 18 are defined by the curvature of convex upper pouring spout surfaces 14, and concave lower throat surface 16, which have been previously discussed, and by a predetermined radius R which in the cross-section shown in FIG. 3 is depicted as R0. The horizontal component and length of lip 18 can best be viewed in FIG. 4 of the drawings.

The top view of vessel 2 shown in FIG. 4 shows the horizontal curvature and length of lip 18 of spout 10. The radius of curvature of the horizontal component of lip 18 in the plane shown in FIG. 4 is depicted as R3. Preferably, R3 is a function of the equation:

$$R3 = 0.5D - 1.97$$

wherein R3 is the radius of curvature of the horizontal component of lip 18 before lip 18 gradually makes a tangential transition at a preselected point 17 to rim region 8 of side wall 6. D of the equation is the nominal inside diameter of vessels having a nominal inside diameter greater than approximately 4.5 inches.

Length L of lip 18 varies as a function of distance from bisect-line BL along the arc occupied by spout 10. Length L is at a maximum at bisect-line BL of the arc, and gradually decreases until it reaches a minimum at the point where lip 18 makes a transition to rim region 8 of side wall 6.

Selected cross-sectional views along the arc occupied by spout 10 taken at bisect-line BL of 0°, 15°, 30°, and 45°, designated as 5a, 5b, 5c, and 5d respectively, show the variation of length of lip 18 as well as the curvature of lip 18 at various stages of transition in FIGS. 5a, 5b, 5c, and 5d. FIGS. 5a–5d thus provide a representative sampling of radius of curvature R of the bottom side of lip 18 with respect to the outside surface of side wall 6. Radius of curvature R for each section taken along the arc at 0°, 15°, 30° and 45° of the preferred embodiment are designated as R0, R15, R30, and R45 respectively in the drawings. The selected cross-sectional views show the angle between the lower most section of lower throat surface 16 and essentially vertical side wall 6 of the preferred embodiment. Such angles are denoted as $\alpha$, $\beta$, $\gamma$, and $\delta$ for the sectional views taken at 0°, 15°, 30°, and 45° of the arc occupied by the spout as shown in FIGS. 5a–5d, respectively. However, should side wall 6 not be essentially vertical, the angle therewith should be compensated accordingly, or alternatively, measured with respect to the vertical center-line of bottom 4 to provide a suitable curvature of lip 18.

A dimension X shown in FIG. 5a–5d depicts the combined curvilinear length of wall 6 and rim 8 or lip 18, as the case may be, at a selected cross-section of the vessel. In the preferred embodiment of the invention, dimension X is of a constant value regardless of the peripheral location of dimension X with respect to vertical center-line CL. In other words, in the preferred embodiment, dimension X of annular wall 6, including rim portion 8, or lip 18, is of the same value when measured anywhere along the arc shown in FIG. 4, or any other point along the periphery of vessel 2. By maintaining X at a constant value, the cross-sectional area of side wall 6, rim 8, and lip 18 remain essentially constant, thereby reducing possible stress concentrations in the vessel as formed. Holding dimension X at a constant value proved to be especially beneficial when fabricating the disclosed vessel from aluminum material.

Figure 11:
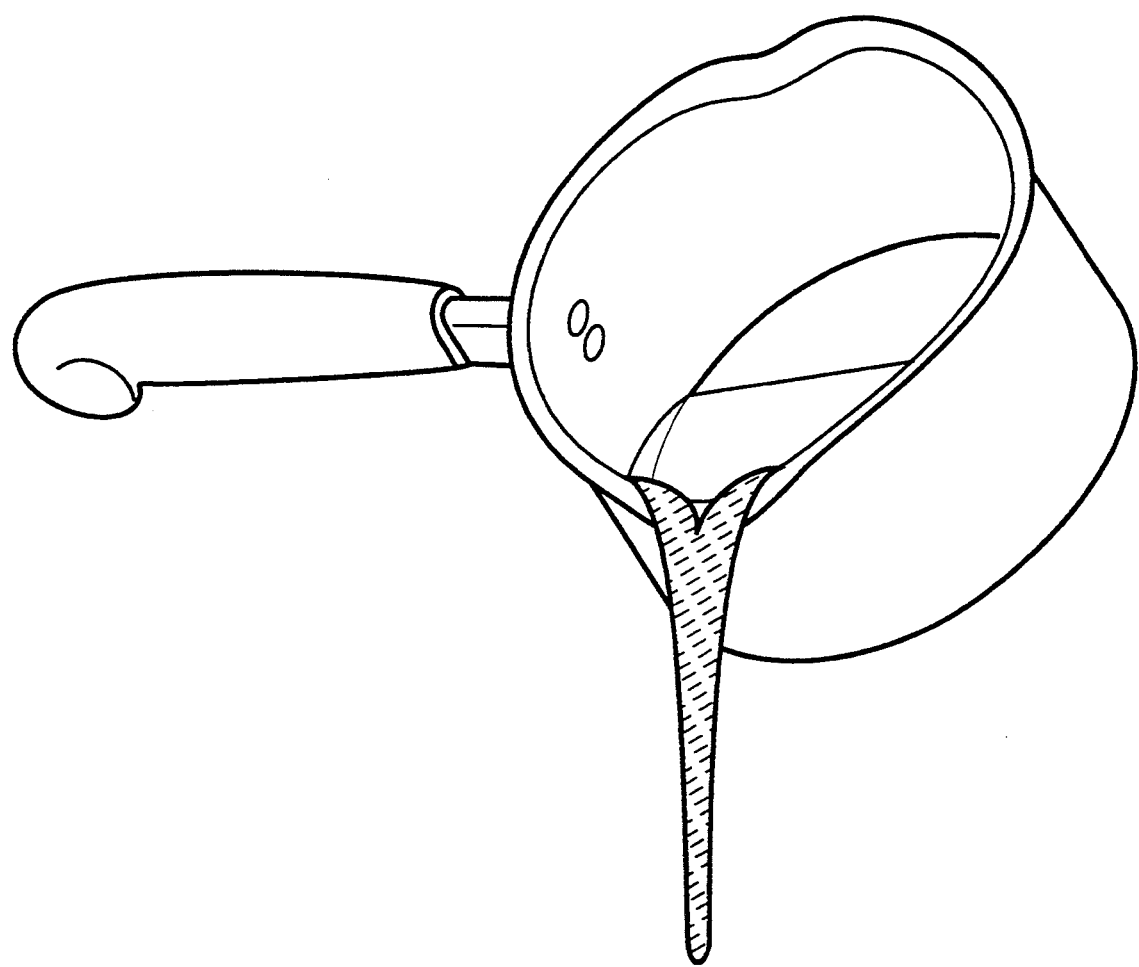
FIG. 11 is a perspective view illustrating the flow pattern produced when liquid is poured from a vessel possessing the inventive pour spout.

A vessel having at least one pouring spout configured in accordance with the disclosed invention provides a pouring spout that will provide a stream so illustrated in FIG. 11, i.e., a stream having a cross-sectional flow pattern initially in the shape of a convex-sided V that reforms into a round, non-turbulent stream regardless of the flow rate of the liquid, and any suspended substances, being poured from the vessel. Such a stream is thus easily directed by the user as the geometry of the stream remains constant thereby greatly aiding the user in directing the stream into receiving vessels, or other receptacles. A vessel having a pouring spout configured as described, also provides a pouring spout that alleviates, or significantly reduces, lapping of the stream onto the side of the vessel. Furthermore, a vessel configured as described, reduces the formation of drips on and from the pouring spout after pouring from the vessel.

The vessel may be formed of any suitable material including aluminum, ceramic, glass, glass-ceramic, plastic, steel, or any other sufficiently rigid and heat resistant material. The vessel may optionally include a non-stick interior surface such as a polytetrafluorethyene based coating. The vessel may also include an exterior coating such as an enamel, or other protective/aesthetic coating material.

An example of an embodiment of the disclosed invention in the form of a cookware vessel having two identical pouring spouts opposite each other, as shown in the drawings, is set forth below:

Example of a Saucepan having a nominal 7 inch Inside Diameter 7.087 inch Inside Diameter measured ½ inch below the rim.

7.598 inch Outside Diameter measured from rim to rim.

Side wall and bottom thickness = 0.098 inches
R1 = 5.248 inches
R2 = 1.575 inches
R3 = 1.575 inches
H = 0.650 inches
D13 = 2.682 inches
D15 = 0.916 inches
L max. = 0.875 inches
L min. = 0.256 inches
Total Arc of spout = 90°
Angle $\alpha = 90°$, R0 = 0.382 inches
Angle $\beta = 81°$, R15 = 0.286 inches
Angle $\gamma = 73°$, R30 = 0.132 inches
Angle $\delta = 50°$, R45 = 0.098 inches
Dimension X was held at a constant value The example saucepan was formed of aluminum alloy 3003 having a non-stick PTFE interior coating and an enamel exterior coating in 2 and 3 quart capacity versions having vessel heights of 4.134 inches and 5.551 inches respectively.

Figure 6:
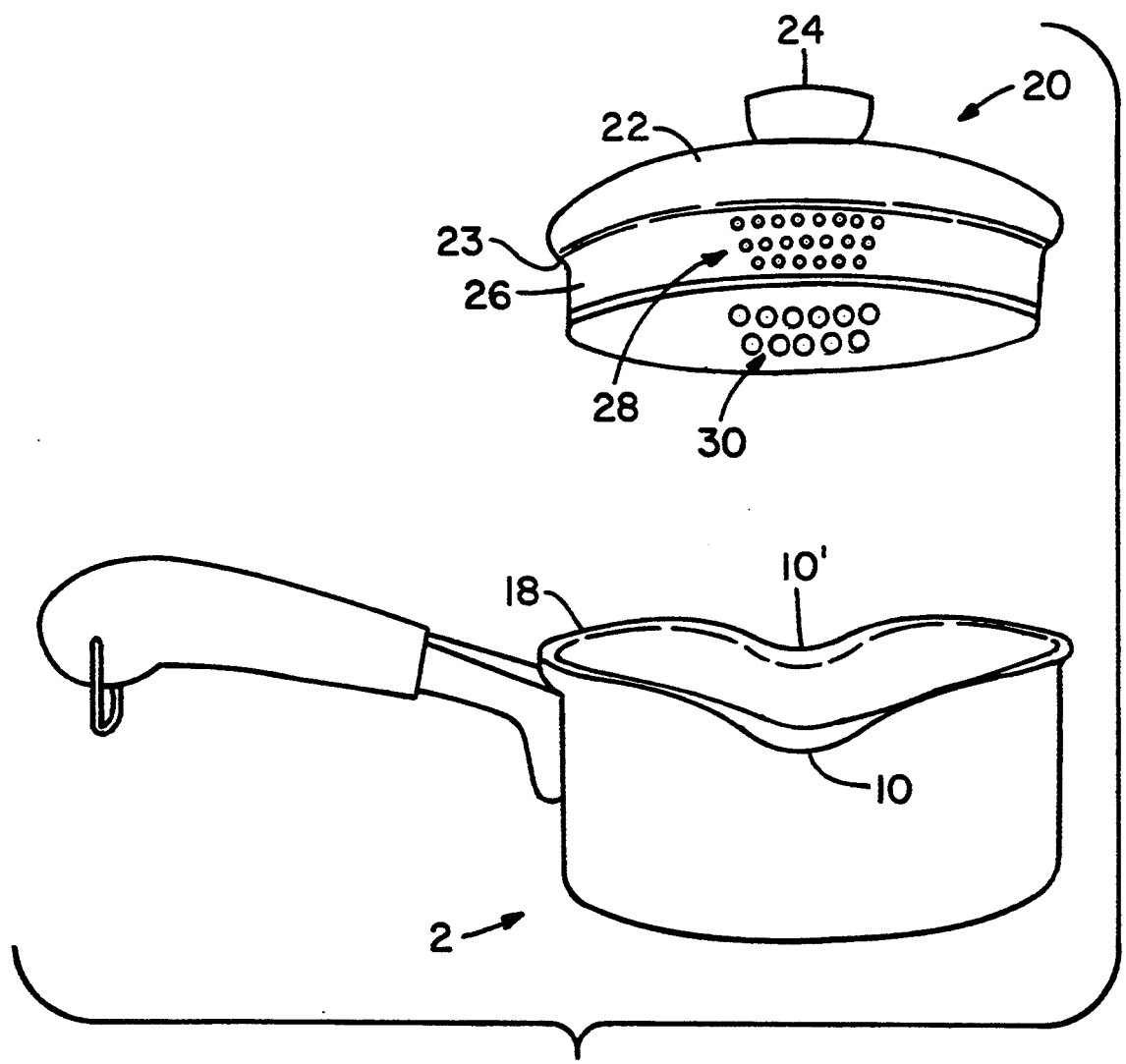
FIG. 6 is a perspective view of the cookware and closure for the same.
Figure 7:
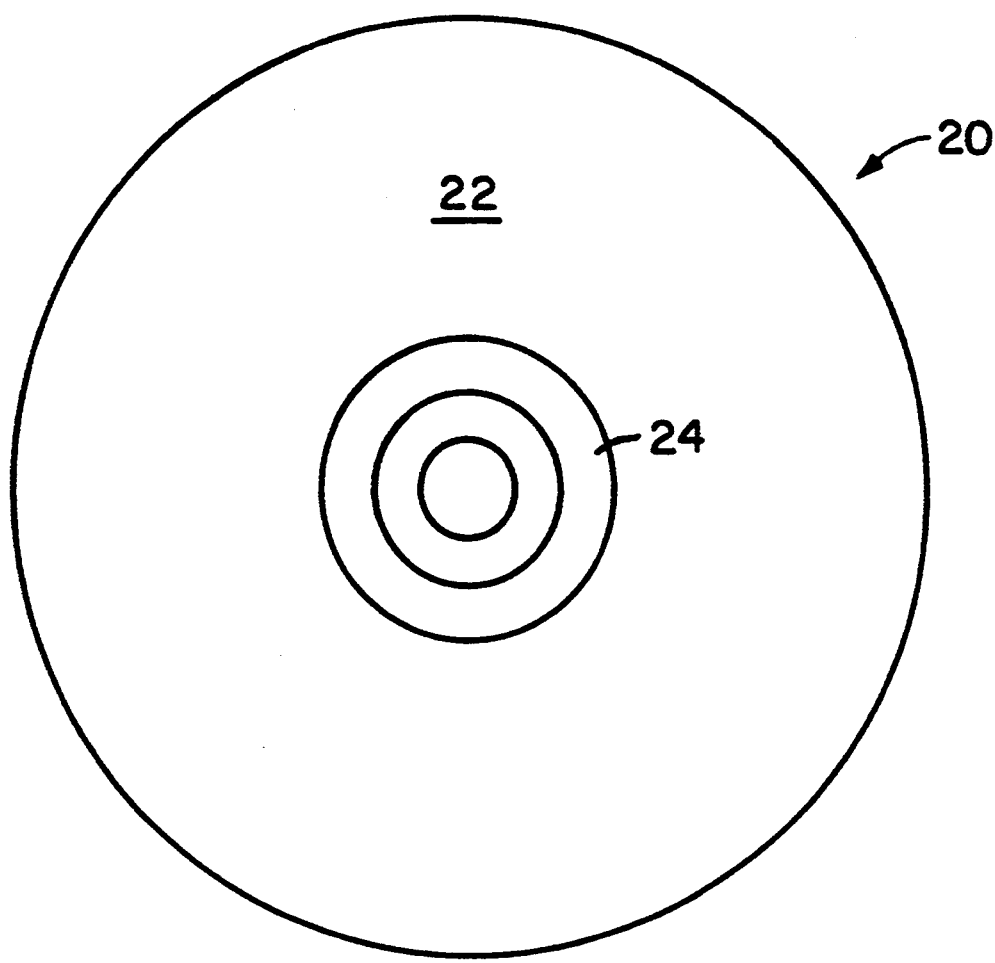
FIG. 7 is top view of the closure.
Figure 8:
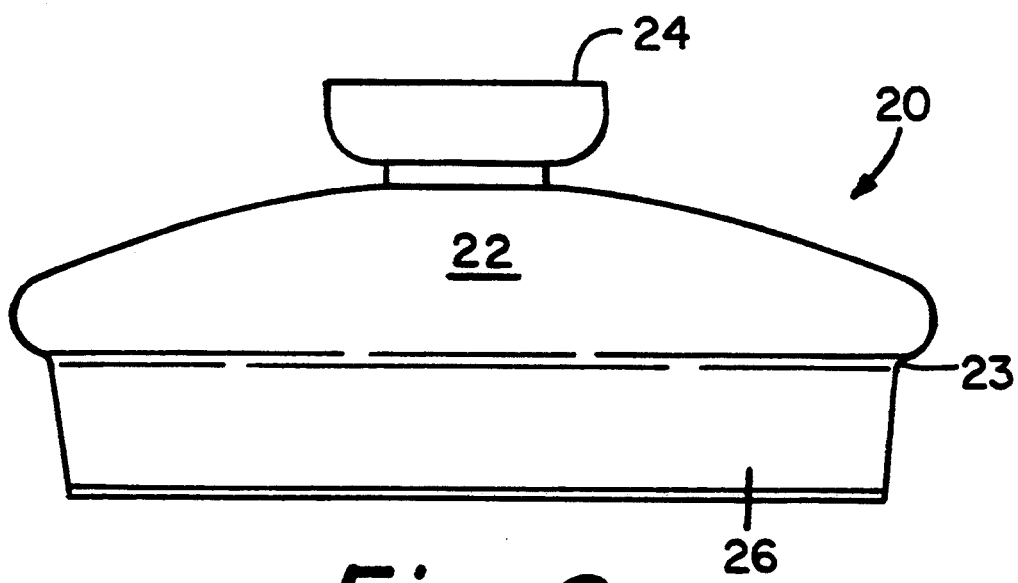
FIG. 8 is a front view of the closure.

A complementary closure for a cooking vessel embodying the disclosed pouring spouts is shown in FIGS. 6–10. Referring now to FIG. 6, a perspective view of a closure, or lid 20, and saucepan 6 is shown. Closure 22 is sized and configured to be received by cooking vessel 4. As shown in FIG. 7, closure 22 includes a circular top surface 22 and a knob 24 for grasping the closure. Top surface 22 is preferably concave and formed to have an outer ridge 23 and a peripheral flange 26 which extends from top surface 22 for a predetermined distance as shown in FIG. 8. Flange 26 is sized and configured to be easily received by vessel 4 with outer ridge 23 seating against rim 18 of vessel 4, thereby providing a closure for the interior of the vessel. Preferably, flange 26 fits snugly within side wall 6, but does not fit so snugly that closure 20 can not be easily rotated when seated against rim 18.

Figure 9:
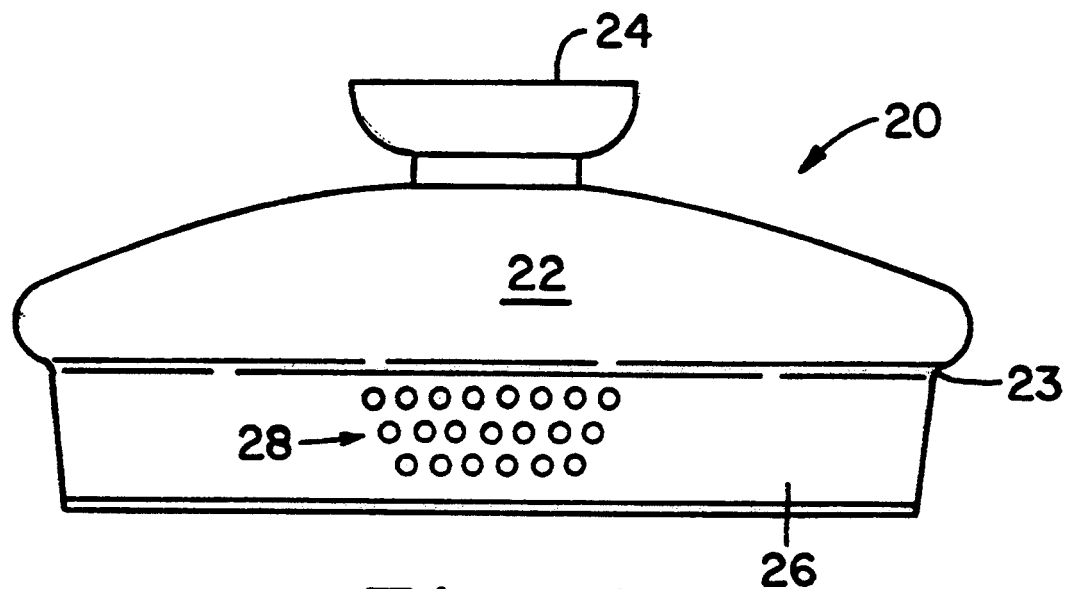
FIG. 9 is a side view of the closure.
Figure 10:
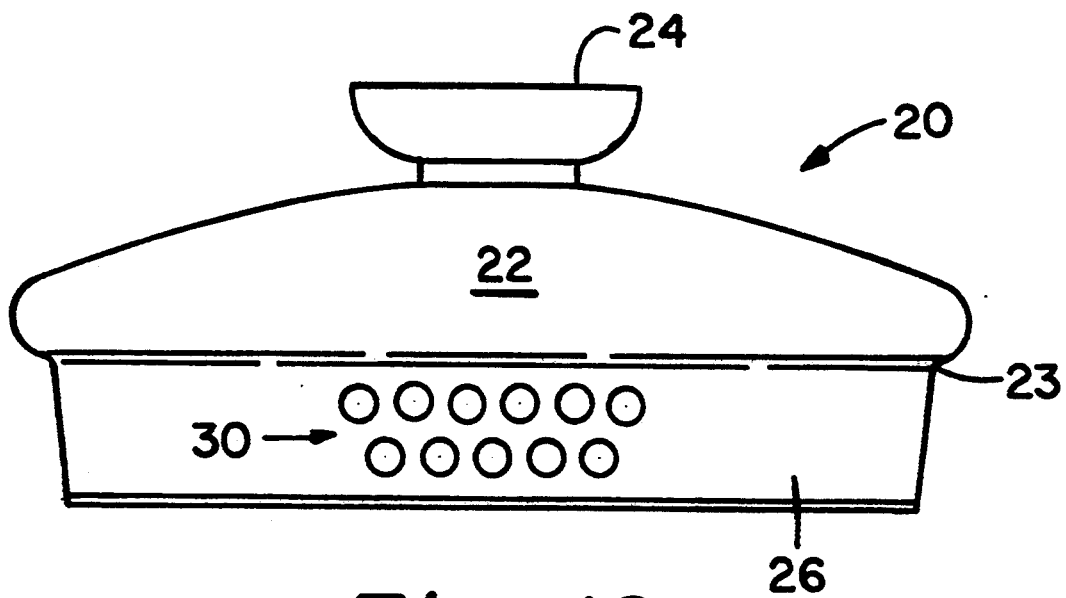
FIG. 10 is a side view of the closure opposite of the side view shown in FIG. 9.

Referring now to FIGS. 9 and 10, flange 26 is preferably provided with at least two opposing sets, or arrays, of openings 28 and 30 for the venting of steam and/or for the straining of liquids being prepared in the vessel. Preferably, opening arrays 28 and 30 have openings of differing sizes, or diameters, to provide an optimal range of straining capabilities. Should opening arrays 28 and 30 have differing sizes or diameters, it is suggested that additional openings be provided in the array having smaller openings to prevent a relative flow restriction through the array having smaller openings when venting or straining.

In order to achieve optimal venting and straining characteristics, flange 26 should extend below lower throat surface 16 (shown in FIG. 2) when closure 20 is fully seated on top of vessel 2. Additionally, the lower most openings included in a particular array, preferably should be positioned on flange 26 such that the openings are slightly elevated above lower throat surface 16 when the closure is seated on vessel 2 and the array of openings is aligned with the pouring spout. Thus, by rotationally orienting closure 20 so that opposing opening arrays 28 and 30 are aligned with respective pouring spouts, steam can be vented from one pouring spout and the contents of the vessel can be strained of liquids while pouring from the opposite pouring spout. Should straining and/or venting not be desired, closure 20 is rotated so as to relocate the opening arrays in position that is not in communication with the pouring spouts. Closure 20 as shown in FIGS. 6–10, was formed for the Example saucepan having a 7 inch nominal diameter described previously in the specification. The closure made for the Example saucepan was made of stainless steel; however, any material having the requisite rigidity and heat resistance could be used. The closure for the Example was provided with a flange having two opposing opening arrays, one of which had a 3 row array of holes numbering 11, and the other which had a 3 row array of smaller diameter holes numbering 21. More than two opening arrays could be positioned in flange 26 and the configuration and number of openings can be optimized to achieve the desired amount of venting and/or straining.

Although the invention has been shown and described with respect to a preferred embodiment of the invention particularly suitable for cookware, it should be noted that the disclosed invention may be practiced in other fields without departing from the spirit and scope of the invention as claimed.

I claim:

1. A vessel comprising:
   a) a vessel bottom having a vertical center-line;
   b) an annular side wall extending upward from the vessel bottom and terminating into a rim portion and having an inside diameter of at least 4.5 inches;
   c) at least one pouring spout formed in the side wall and extending peripherally about the side wall for about a 90° arc with respect to the vertical centerline of the bottom, the at least one spout being peripherally centered about a bisect-line of the arc;
   d) the at least one pouring spout being defined by the rim portion making a transition into opposing convex tipper pouring spout surfaces which possess a radius of curvature, indicated as R1, determined by the equation $R1 = 1.44D - 4.96$ and which converge upon and intersect with a concave lower throat surface having a lower most portion and a radius of curvature, indicated as R2, determined by the equation $R2 = 0.52D - 2.11$ the lower most portion of the concave lower throat surface being positioned a predetermined distance below the rim portion of the side wall, the predetermined distance, indicated as H, is determined by the equation $H = 0.005D + 0.516$ wherein D is the inside diameter of the vessel; and
   e) the at least one pouring spout having a lip extending outwardly away from the side wall, the lip having a predetermined curve profile with vertical and horizontal components, the horizontal component of the curve profile of the lip in the vicinity of the bisect-line of the arc occupied by the spout includes a radius of curvature, indicated as R3, determined by the equation $R3 = 0.5D - 1.97$ and a predetermined length that varies as a function of peripheral distance from the bisect-line of the arc occupied by the at least one pouring spout in such manner to provide the lip with a maximum length at the bisect-line of the arc and a minimum length where the concave upper pouring spout surfaces respectively transition into the rim portion.

2. The vessel of claim 1 wherein the vessel possesses a closure means having a top surface and a peripheral flange extending from the top surface for a predetermined distance, the flange being configured and dimensioned to be slidably received and rotationally positionable within the side wall of the vessel, and the flange having at least one array of openings capable of alignment with said at least one pouring spout.

3. The vessel of claim 2 wherein the openings located in the flange of the closure means are circular in shape.

4. The vessel of claim 2 wherein the vessel possesses two opposing pouring spouts and the closure means flange has two opposing opening arrays each having a multitude of openings.

5. The vessel of claim 4, wherein the openings in one array are larger and fewer in number than the openings in the opposing array.

* * * * *